US008513909B2

(12) United States Patent
Knezevic

(10) Patent No.: US 8,513,909 B2
(45) Date of Patent: Aug. 20, 2013

(54) PROCESSING A MOTOR VARIABLE OF A DC MOTOR AND ACTUATING DEVICE FOR A MOTOR VEHICLE

(71) Applicant: Brose Fahrzeugteile GmbH & Co. Kommanditgesellschaft, Hallstadt, Hallstadt (DE)

(72) Inventor: Jovan Knezevic, München (DE)

(73) Assignee: Brose Fahrzeugteile GmbH & Co. Kommanditgesellschaft, Hallstadt, Hallstadt (DE)

( * ) Notice: Subject to any disclaimer, the term of this patent is extended or adjusted under 35 U.S.C. 154(b) by 0 days.

(21) Appl. No.: 13/656,878

(22) Filed: Oct. 22, 2012

(65) Prior Publication Data
US 2013/0043820 A1 Feb. 21, 2013

Related U.S. Application Data

(63) Continuation of application No. PCT/EP2011/001580, filed on Mar. 30, 2011.

(30) Foreign Application Priority Data

Apr. 22, 2010 (DE) .......................... 10 2010 017 835

(51) Int. Cl.
*G05B 19/23* (2006.01)
(52) U.S. Cl.
CPC .................................... *G05B 19/232* (2013.01)
USPC ............ 318/603; 318/565; 318/615; 318/490

(58) Field of Classification Search
CPC ....................................................... G05B 19/232
USPC ........................ 318/603, 565, 615, 439, 490
See application file for complete search history.

(56) References Cited

U.S. PATENT DOCUMENTS

| 6,144,179 A | 11/2000 | Kessler et al. |
| 6,859,030 B2 | 2/2005 | Otte |
| 8,138,712 B2 * | 3/2012 | Yamada ........................ 318/807 |
| 2011/0270558 A1 | 11/2011 | Knezevic et al. |

FOREIGN PATENT DOCUMENTS

| DE | 197 29 238 C1 | 8/1998 |
| DE | 100 28 035 A1 | 12/2001 |
| WO | 2010/028736 A2 | 3/2010 |

OTHER PUBLICATIONS

International Search Report of PCT/EP2011/001580, 2011.

* cited by examiner

*Primary Examiner* — Eduardo Colon Santana
*Assistant Examiner* — David Luo
(74) *Attorney, Agent, or Firm* — Laurence A. Greenberg; Werner H. Stemer; Ralph E. Locher

(57) ABSTRACT

A method processes a motor variable of a DC motor of an actuating device for a motor vehicle. The DC motor is supplied by an on-board system DC voltage, in which the armature current and the motor voltage of the DC motor are detected and the actuating position of an actuating element is determined from a time profile of the armature current by counting the current ripple contained therein. During an initial phase, the armature current which rises over time is replicated by a function which is determined from pairs of values for the motor voltage and the armature current which are detected in a time interval. A current value of the armature current expected at a later point in time is extrapolated. In the event of a discrepancy between the armature current detected at this later point in time and the extrapolated armature current, a ripple count is started.

10 Claims, 5 Drawing Sheets

US 8,513,909 B2

PROCESSING A MOTOR VARIABLE OF A DC MOTOR AND ACTUATING DEVICE FOR A MOTOR VEHICLE

CROSS-REFERENCE TO RELATED APPLICATION

This application is a continuation, under 35 U.S.C. §120, of copending international application No. PCT/EP2011/001580, filed Mar. 30, 2011, which designated the United States; this application also claims the priority, under 35 U.S.C. §119, of German patent application No. DE 10 2010 017 835.7, filed Apr. 22, 2010; the prior applications are herewith incorporated by reference in their entirety.

BACKGROUND OF THE INVENTION

Field of the Invention

The invention relates to a method for processing at least one motor variable of a DC motor of an actuating device for a motor vehicle, in which method the armature current and the motor voltage are detected and the actuating position of an actuating element is determined from the time profile of the armature current by counting the current ripple contained therein. The invention also relates to an actuating device which operates in accordance with the method.

A large number of motorized actuating devices are usually present in a modern motor vehicle. An actuating device of this kind is, for example, an electric window lifter, an electric seat-adjusting system or a device for the motorized adjustment of a vehicle door, a trunk lid, a sliding roof or a top of a convertible vehicle.

As part of an actuating process of an actuating device of this kind, a desired end position often has to be precisely approached. To this end, it is necessary to exactly know the actuating position of the actuating device. Furthermore, it is often also necessary to know the current actuating position or variables which can be derived from the current actuating position, such as the actuating speed (motor rotation speed), the actuating direction (direction of motor rotation) or the actuating path covered (adjustment path), for reliable identification of an instance of trapping.

An actuating device of the abovementioned kind is often operated by a mechanically commutated DC motor (commutator motor). In an actuating device of this kind, the actuating position can be determined by counting the so-called motor or armature current ripple. In this case, a characteristic ripple, that is to say a periodic, pulsed fluctuation of the motor or armature current, which is caused by the commutation of the DC motor is called a current ripple. The current ripples contained in the motor or armature current signal occur at a frequency which corresponds to the number of commutator laminations, so that counting the current ripples provides reliable information about the current (instantaneous) rotation position of the armature (rotor) and therefore in respect of the instantaneous position of the actuating element, which is driven by the DC motor, in the predetermined adjustment path of the actuating element.

However, counting the current ripples is generally not possible without errors over the entire length of a typical actuating process. Therefore, a typical actuating process is broken down into an initial starting-up phase (start-up phase) and a subsequent equilibrium phase (steady state) and a freewheeling phase and a subsequent braking phase. As is known, the drive-off phase is preceded by an initial phase in which the DC motor or the armature winding of the DC motor already has current supplied to it but the armature (rotor) is not yet moving (that is to say not yet rotating) and therefore the DC motor is stationary.

During the starting-up phase, the motor speed settles at a stable final speed. In the subsequent equilibrium phase, the final speed and therefore also the frequency of the current ripple is approximately constant. The freewheeling phase is initiated by the two connections of the commutator motor being connected to ground for the purpose of ending the actuation process. In this case, the freewheeling phase extends over the duration of the switching process, including a switching-related bounce phase, and typically lasts for approximately 3 ms to 4 ms. Owing to the switching process, no armature current (motor current) or an armature current (motor current) which is only extremely difficult to reproduce flows in the freewheeling phase—in the case of a substantially unchanged actuating speed of the motor. As soon as both motor contacts are stably connected to ground, the freewheeling phase changes over to the subsequent braking phase. In the braking phase, the electric motor, which is short-circuited via ground, is operated as a generator and is braked by the circulating current generated in this way.

Whereas the current ripple from the armature current signal over time can be used comparatively reliably for the purpose of position determination within the starting-up phase and, in particular within the subsequent equilibrium phase, determination of the first (detectable) current ripple at the beginning of the starting-up phase, when the motor or the actuator of the motor begins to rotate (to move), presents a problem. This can lead, in turn, to a ripple counter beginning the ripple count too late or not taking into account one of the first initiated current ripples. This results in an undesired miscounting and therefore a deviation, which is to be avoided, in the determined actuating position of the actual position of the actuating element.

SUMMARY OF THE INVENTION

The invention is based on the object of improving processing of at least one motor variable, in particular the armature current (motor current), of a DC motor, which is supplied by an on-board electrical system DC voltage, of an actuating device for a motor vehicle. In this case, the aim is, in particular, to improve the detection and evaluation of the current ripple.

The invention proceeds from a method in which the armature current and the motor voltage of the DC motor are detected and the actuating position of an actuating element is determined from the time profile of the armature current by counting the current ripples contained therein.

In respect of a method for processing at least one motor variable of a DC motor, which is supplied by an on-board electrical system DC voltage, of an actuating device for a motor vehicle, the object is achieved, according to the invention, by the features of the claims. In the claims, it is provided that, during an initial phase in which the stationary DC motor is already supplied with current, the armature current, which increases over time, is mapped by a function which is determined from pairs of values, which are detected in a time interval, of the motor voltage and of the armature current. A current value of the armature current which can be expected at a later time is extrapolated therefrom. In the event of a deviation in the armature current, which is detected at this later time, from the extrapolated value (of the armature current), the ripple count is started for the purpose of detecting the current ripples. The counter is ideally started together with the starting-up or start-up phase, that is to say when the DC motor starts up and generates the first current ripple.

In this case, the term "motor variable" generally denotes any desired current intensity or voltage variable of the motor or armature current which allows a conclusion to be drawn about the operating state of the actuating device, in particular counting of the current ripples. The motor variable is preferably also the so-called back e.m.f (E). Furthermore, the winding resistance of the armature winding (armature winding resistance $R_a$) and the armature winding inductance ($L_a$) and therefore the self-induced component of the motor voltage ($L_a \cdot dI_a/dt$) are also used as the motor variable.

The invention proceeds from the consideration that, firstly, during the initial phase in which the DC motor which is still stationary is already supplied with current, the armature current increases at least approximately linearly with time, and that, secondly, during this initial phase, the back e.m.f. (E) is equal to zero owing to the armature of the DC motor not yet moving. Therefore, the gradient of the armature current which increases linearly over time can be determined from the electrical equation of the DC motor according to the relationship $U_m = R_a \cdot I_a + L_a \cdot dI_a/dt + E$, where $E=0$, on the basis of the already two current and voltage values measured in a time interval of the linear increase in current. The gradient can be used, in turn, to calculate a current value of the armature current which can be expected at a later time if, at this later time, the DC motor were to remain stationary and accordingly the self-induction and therefore the back e.m.f is still zero (E=0). If, however, the expected current value deviates from the current value measured at the same time, therefore the actual current value, at this later time, it can be assumed that the motor has already moved at this later time, this resulting in a back e.m.f. which differs from zero ($E \neq 0$).

In order to take into account tolerances and measurement inaccuracies, it is advantageous when the deviation, which was determined at the later time, in the current value, which is expected when the motor is stationary, from the actual current value of the armature current is compared with a (predefinable) reference or threshold value. In this case, the threshold value is ideally defined in such a way that the motor actually moves or the armature actually rotates, but the first expected current ripple has still not yet occurred. If this threshold value is exceeded by the deviation (difference) in the actual armature current from the extrapolated current value, this criterion can be used for initializing the ripple count. This ensures that the first current ripple is already identified and a counting error due to the first current ripple—or a subsequent current ripple—not being identified is avoided.

As is known, the winding resistance and the winding induction of the armature can be calculated on the basis of the electrical equation of the DC motor, for example as part of a reference measurement of the time profile of the armature current during a suitable time interval on the basis of two temporally offset measurements of the armature current and of the armature voltage. If these motor variables are known, the expected current value can be reliably calculated. This expected current value is used for the comparison with the armature current value which is actually detected at this later time. Therefore, firstly the armature winding resistance and secondly the armature winding inductance are determined in a suitable manner from two pairs of values, which are detected in the time interval of the motor voltage and of the armature current. These variables (armature winding resistance and armature winding inductance) are then used to determine the extrapolated armature current at the later time.

In order to be able to determine the current ripples during the initial phase or the constant-running or equilibrium phase as far as possible without interference and exactly, the armature current is supplied to a controllable frequency filter which generates an output signal, which is proportional to the rotation speed, on the basis of the detected current ripple. To this end, a control signal, which is determined from the back e.m.f ($E \neq 0$) of the DC motor, and a filter input signal, which is derived from the armature current signal and from the motor voltage, are supplied to the frequency filter. In this case, the back e.m.f. is ideally determined from the motor voltage and the product of the armature current and the armature resistance.

The motor voltage is ideally weighted with a low-pass-characteristic filter and a correction signal is derived therefrom. The filter signal is generated from the difference between the armature current signal and the correction signal of the motor voltage. In addition, a low-pass-filtered control signal is expediently supplied to the controllable frequency filter.

According to a further aspect of the invention, the DC motor is actuated by a pulse-width-modulation signal (PWM signal), the duty cycle thereof being set as a function of voltage fluctuations in the on-board electrical system DC voltage. As a result, voltage fluctuations in the on-board electrical system or battery voltage of the vehicle can be filtered out, otherwise these would also be reflected in the (measured) armature current signal. Voltage fluctuations of this kind can lie in the frequency range of the current ripple frequency, and this would lead to counting errors. The sampling frequency for the PWM signal is expediently in the region of 20 kHz, this corresponding to a period duration of the PWM signal of $T_{PWM}=50$ µs.

In an advantageous refinement of this voltage filtering, a fixed duty cycle of the PWM signal is determined on the basis of the ratio between a reference voltage and a filter voltage. In this case, the filter voltage corresponds to the nominal on-board electrical system DC voltage which is free of voltage fluctuations. The duty cycle is increased or reduced depending on the deviation in the current on-board electrical system DC voltage from the filter voltage at a comparatively low or comparatively high voltage value. If, for example, a duty cycle of 70% is set with the nominal on-board electrical system DC voltage, the duty cycle is—virtually in real-time—increased, for example, to 80% in the event of a voltage fluctuation to a voltage value below the nominal on-board electrical system DC voltage. Analogously, the duty cycle is—again virtually in real-time—reduced to, for example, 50% or 60% in the event of a deviation in the current on-board electrical system DC voltage to a voltage value which exceeds the nominal on-board electrical system voltage.

The object is additionally achieved, according to the invention, by an actuating device for a motor vehicle having a mechanically commutated DC motor which is supplied by an on-board electrical system DC voltage, and having a control unit for actuating the DC motor. In this case, the control unit is configured to carry out the above-described method, that is to say is configured in the form of a program and/or circuit. The control unit and/or functional modules (blocks) which are provided for carrying out the method are preferably formed by a microprocessor (microcontroller).

In a suitable refinement of the actuating device, the DC motor is connected into an electronic bridge circuit (H-bridge) between two bridge paths with a high-potential-side semiconductor switch and a low-potential-side semiconductor switch in each case. The control inputs of the semiconductor switches are connected to the control unit or to the microcontroller and are actuated by the control unit or microcontroller by the PWM signal with a duty cycle which changes as a function of voltage fluctuations in the battery or on-board electrical system DC voltage. The control unit or the microcontroller is configured or programmed to firstly calculate, in particular by extrapolation, a current value which is expected at a specific time during the starting-up phase of the DC motor which is supplied with current but is still stationary. Secondly, the control unit or the microprocessor is configured or programmed to filter out voltage fluctuations in the on-board electrical system voltage by suitably changing the duty cycle of the PWM signal, so that the DC motor is actuated and operated virtually with a constant supply voltage (operating voltage) which is free of interference and fluctuations.

Other features which are considered as characteristic for the invention are set forth in the appended claims.

Although the invention is illustrated and described herein as embodied in a processing a motor variable of a DC motor and an actuating device for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Corresponding parts and variables are provided with the same reference symbols in all the figures.

Figure 1:
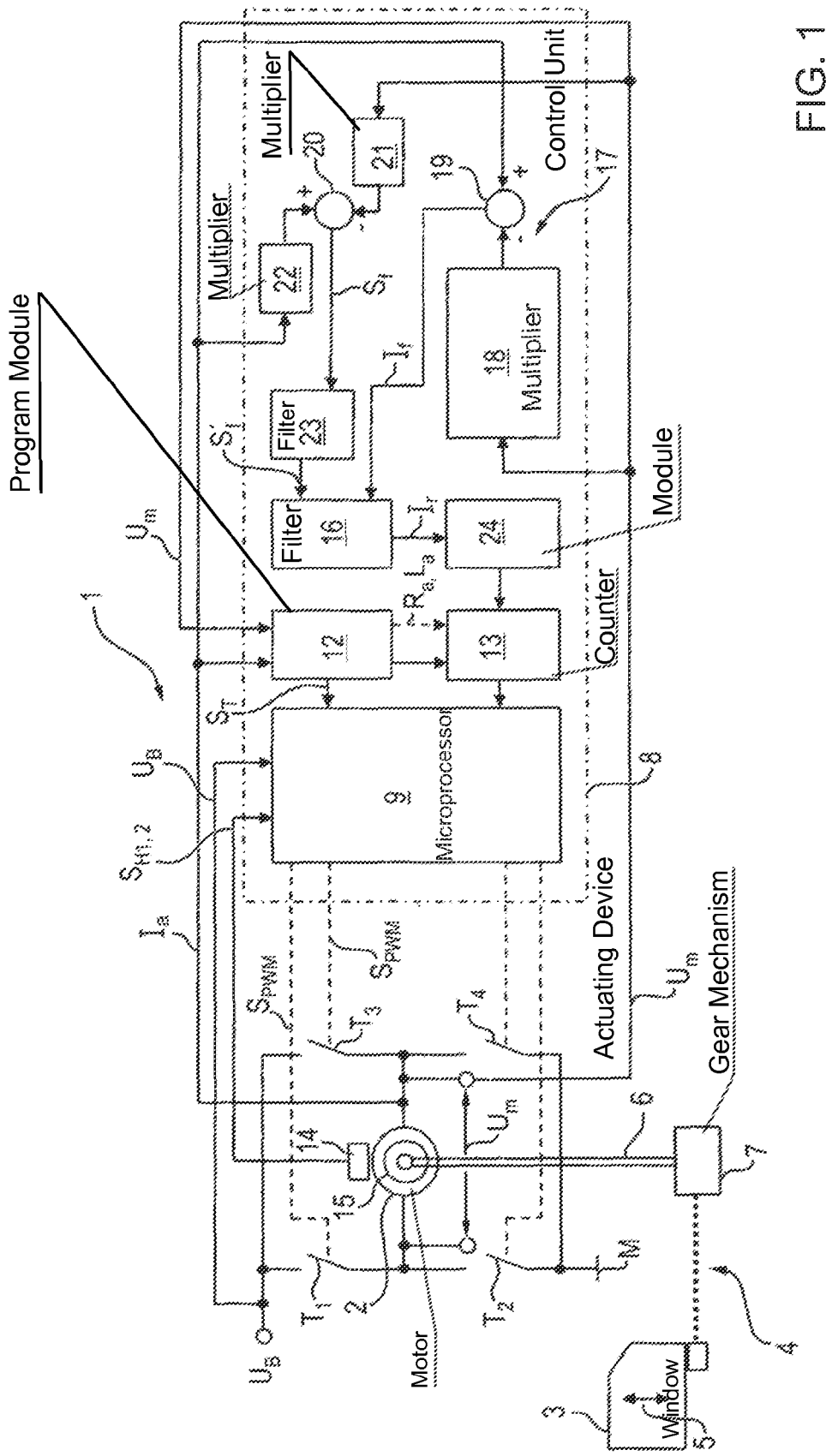
FIG. 1 is a block diagram showing functional blocks of an actuating device with a control unit for processing motor variables of a DC motor according to the invention.

Referring now to the figures of the drawing in detail and first, particularly, to FIG. 1 thereof, there is shown a block diagram representing the functionality of a method and an actuating device 1 for determining current ripples which are generated in an armature current signal $I_a$ of a mechanically commutated DC motor 2 as a result of the DC motor being commutated. The DC motor 2 is supplied with a battery or on-board electrical system DC voltage $U_B$ which is called the operating DC voltage. The current ripples are superimposed on the DC signal of the DC motor 2 as an AC signal component. Since the number of commutator laminations of the DC motor 2 is known, the motor rotation speed and the position of the motor armature (armature position) can be determined from the number of current ripples per unit time.

The armature position again corresponds to a position of an actuating element, which is driven by the DC motor 2, of a motor vehicle. Therefore, for example, the window position of a vehicle window 3, which can be automatically adjusted by a window-winder drive as the actuating device 1, as the actuating element 3 of a motor vehicle along its adjustment path between an upper closed position and a lower open position can be precisely determined using relatively simple means. In this case, the actuating device 1 contains the DC motor 2 which is coupled to the vehicle window 3 by means of an actuating mechanism 4 in such a way that the vehicle window 3 can be moved between an open position and a closed position within an actuating region (adjustment path) 5.

The actuating mechanism 4 contains a drive shaft 6 which is coupled to an armature, which is called the rotor, of the DC motor 2 and which acts on the vehicle window 3 by a gear mechanism 7. The actuating device 1 also contains a control unit 8 which is formed by a microcontroller 9 or contains a microcontroller 9. The control unit 8 acts on four semiconductor switches $T_1$ to $T_4$ of an H-bridge which operates as a step-down actuator and has two bridge paths each with a high-potential-side ($+U_B$) semiconductor switch $T_1$, $T_3$ and a low-potential-side (ground M) semiconductor switch $T_2$ or $T_4$. The DC motor 2 is connected between the bridge paths, and there between the semiconductor switches $T_1$ and $T_2$ and also $T_3$ and $T_4$, by way of its motor connections. The operating voltage $U_B$ is the battery or on-board electrical system DC voltage of the motor vehicle.

Measurement values $I_a$ and $U_m$ of the motor or armature current intensity $I_a$ or the motor voltage $U_m$ and the operating voltage $U_B$ or a measurement value which is proportional thereto are supplied to an input end of the control unit 8. A control program is implemented by software in the control unit 8 or in the microprocessor 9 thereof. The control unit 8 contains the functional blocks which are described in greater detail below. The control program of the microcontroller 9 actuates the DC motor 2 for carrying out actuating processes firstly by switching the semiconductor switches $T_1$ to $T_4$, as a result of which the vehicle window 3 is moved in the direction of the open or closed position. To this end, the microprocessor 9 generates a pulse-width-modulated control signal (PWM signal) $S_{PWM}$ which, depending on the direction of rotation of the DC motor 2, is supplied to the high-potential-side semiconductor switch $T_1$ or $T_3$ while the respective low-potential-side semiconductor switch $T_2$ or $T_4$ is connected by the microprocessor 9.

The motor armature in the DC motor 2 rotates within the stator field of the DC motor during operation of the DC motor 2. As a result, a voltage, which is also called the back e.m.f. E, is induced in accordance with the generator principle in the armature windings (armature coils) during motor operation, the voltage having a polarity in accordance with the operating voltage $U_B$ and therefore opposing the armature current $I_a$. The back e.m.f. E is linearly dependent on the armature or motor rotation speed and causes the motor to operate as a generator when the direction of the armature current $I_a$ is reversed, and can therefore be used to brake the DC motor 2.

Figure 2:
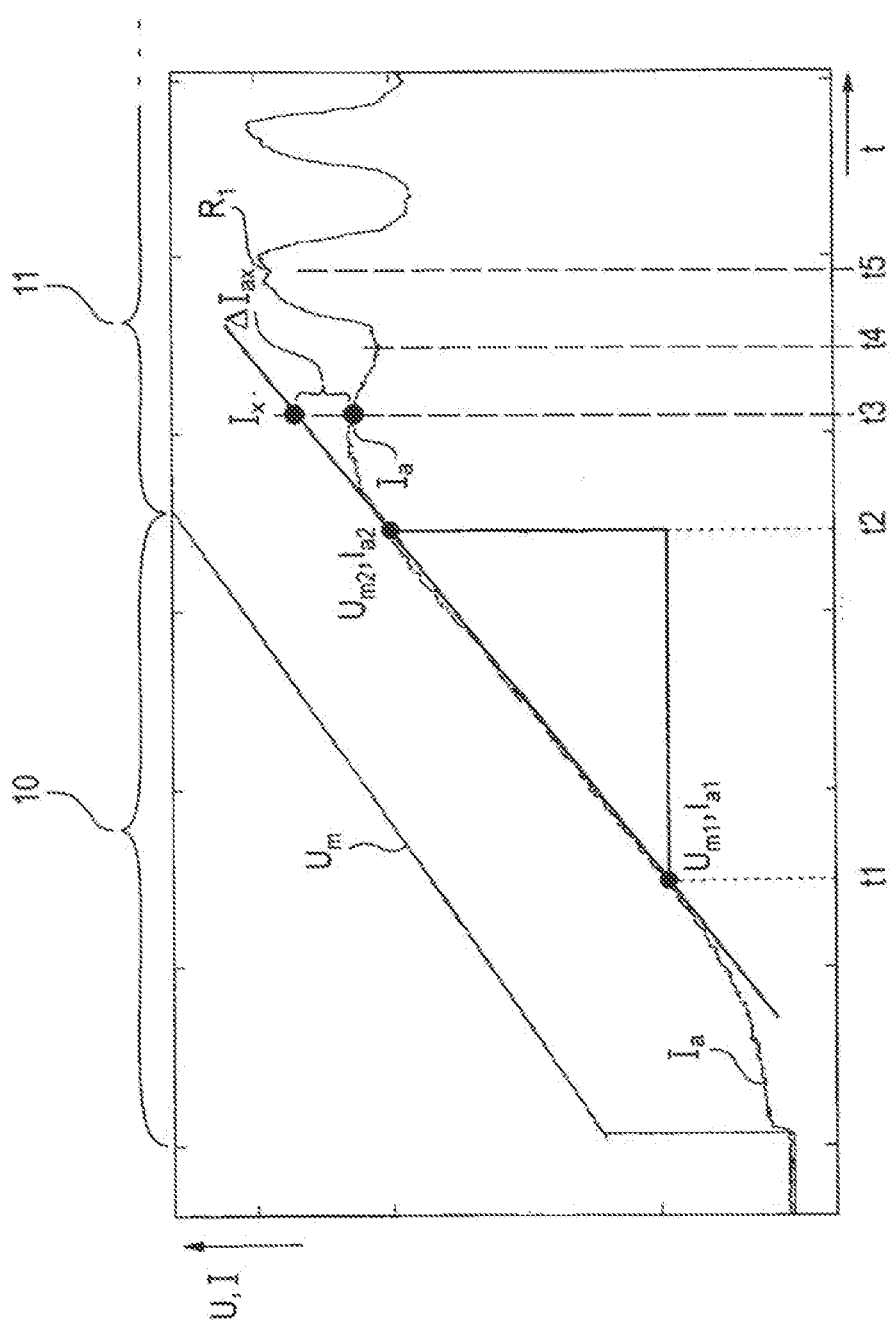
FIG. 2 is a graph showing a typical profile of an armature current and of an armature voltage of the DC motor over time during an initial phase and at a beginning of a start-up phase.

When the DC motor 2 is stationary and therefore also during an initial phase in which the DC motor 2 or the armature windings thereof are already supplied with current, the back e.m.f. E is equal to zero (E=0). The winding resistance $R_a$ of the armature windings of the DC motor 2 is comparatively small, and therefore the armature current $I_a$ increases at least approximately linearly to a specific current value, and in this case at least within a specific time interval $\Delta t = t_2 - t_1$, during the initial phase when the motor armature is not yet rotating. This increase in the armature current $I_a$ during the initial phase within the time interval $\Delta t$ is shown in FIG. 2.

In order to process the relevant motor variables, in particular the armature current, for reliably detecting and filtering and counting the current ripples, which are contained in the armature current (in the time profile of the armature current or armature current signal) $I_a$, for the purpose of determining the rotation position of the motor armature of the DC motor 2 as exactly as possible and determining as exactly as possible the position of the actuating element (vehicle window) 3, the following equation (1) is used, the equation showing the mathematical model of the DC motor 2:

$$U_m = R_a \cdot I_a + L_a \cdot \frac{dI_a}{dt} + E. \tag{1}$$

In the equation, the term $L_a \cdot dI_a/dt$ indicates the self-induced voltage and the term E indicates the back e.m.f., where $L_a$ is the winding inductance and $R_a$ is the winding resistance of the armature winding. $U_m$ and $I_a$ are the measured motor voltage and, respectively, the measured armature current.

The armature current $I_a$ increases linearly over time t during an initial phase 10 which is illustrated in FIG. 2. The motor voltage $U_m$ also increases linearly in the initial phase 10. The gradient of the armature current $I_a$, which is linear in the illustrated time interval $\Delta t_{1,2}$, can be determined (calculated) during the initial phase 10 in which in each case a pair of values $U_{m1}(t_1), I_{a1}(t_1)$ and $U_{m2}(t_2), I_{a2}(t_2)$ can be detected at times $t_1$ and $t_2$ in the illustrated time interval $\Delta t_{1,2}$. This calculation is determined (calculated) by the microprocessor 9 and therefore by the control unit 8 on the basis of equation (1). Since current is already supplied in the initial phase 10 in which the DC motor 2 or the armature thereof is still stationary, the back e.m.f. E is equal to zero (E=0), this giving the following relationships (equations):

$$U_{m1} = R_a I_{a1} + L_a \cdot \frac{dI_{a1}}{dt} \tag{2}$$

$$U_{m2} = R_a \cdot I_{a2} + L_a \cdot \frac{dI_{a2}}{dt} \tag{3}$$

$$\frac{dI_{a1}}{dt} = \frac{dI_{a2}}{dt} = \frac{I_{a2} - I_{a1}}{t_2 - t_1} \tag{4}$$

$$U_{m2} - U_{m1} = R_a \cdot (I_{a2} - I_{a1}) \tag{5}$$

$$R_a = \frac{(U_{m2} - U_{m1})}{(I_{a2} - I_{a1})} \tag{6}$$

$$L_a = \frac{U_{m2} - R_a \cdot I_{a2}}{\left(\frac{I_{a2} - I_{a1}}{t_2 - t_1}\right)} \tag{7}$$

$$\frac{dI_a}{dt} = \frac{1}{L_a} \{U_m - R_a(\theta) \cdot I_a - E\}. \tag{8}$$

In this case, the first ripple $R_1$ (FIG. 2) can be identified by looking at equation (8). This is the result of the DC motor 2 moving following the initial phase 10 and accordingly the back e.m.f. not being equal to zero (E≠0). Since the winding resistance $R_a$ of the armature winding is additionally dependent on the armature position or rotor position of the DC motor 2, the two effects influence the changes in the armature current $I_a$. In this case, it can be assumed that the first current ripple $R_1$ occurs in the starting-up phase 11 when the change $\Delta I_{ax}$ in current indicated in FIG. 2 has reached or exceeded a specific threshold value $I_s$ ($\Delta I_{ax} \geq I_s$).

The value $\Delta I_{ax}$ is the deviation in the instantaneous (measured) armature current $I_a(t_3)$ at time $t_3$ following the initial phase 10 from a current value $I_x$ which is expected at this time $t_3$ and is extrapolated in accordance with the following relationships (equations). To this end, when E=0, equations (1) to (7) give the following:

$$\frac{L_a(I_x - I_{a1,2})}{(t_3 - t_{1,2})} = U_x - R_a \cdot I_x \tag{9}$$

$$(t_3 - t_{1,2}) = \Delta t \tag{10}$$

$$I_x(t_3) = \frac{U_x \cdot \Delta t / L_a + I_{a1,2}}{1 + \frac{\Delta t \cdot R_a}{L_a}} \tag{11}$$

$$\Delta I_{ax} = I_x(t_3) - I_a(t_3). \tag{12}$$

If the value $\Delta I_{ax}$ which is calculated by the control device 8 or by the microprocessor 9 is greater than or equal to a specific (predefined) threshold value $I_S$, it can be assumed that the minimum which is expected at time $t_4$ will be followed by a maximum armature current $I_a$ which characterizes the first current ripple $R_1$.

A functional or program module 12 (FIG. 1), to which the measured armature current $I_a$ and the measured motor voltage $U_m$ are supplied, is used to identify the first current ripple $R_1$ and to determine the parameters according to equations (1) to (12). This functional module 12 supplies a trigger signal $S_T$ to the microprocessor 9 when the first current ripple $R_1$ has been identified or detected. The functional module 12 additionally starts a ripple counter 13 to which the determined motor variables $R_a$ (armature winding resistance) and $L_a$ (armature winding inductance) are supplied. The ripple counter 13 is accordingly started and the microprocessor 9 is triggered when the approximate current value $I_x$ deviates from the armature current $I_a$ which is measured at the same time $t_3$ and this deviation $\Delta I_{ax}$ exceeds the predefined threshold value $I_S$. The ripple counter 13 then counts the current ripples $R_n$ which are contained in the armature current signal $I_a$ and are detected during the starting-up phase 11 and the subsequent equilibrium phase. The microprocessor 9 or the control unit 8 determines the rotation speed n or the rotation rate of the DC motor 2 and/or the current actuating position of the actuating element (vehicle window) 3 from the current ripples.

Hall signals $S_{H1,2}$ (FIG. 3) may also be supplied to the microprocessor 9 or to the control device 8 for the purpose of determining the rotation speed, direction of rotation and/or position of the DC motor 2 or of the actuating element (vehicle window) 3. To this end, a Hall sensor 14 interacts with a ring magnet 15 which is fixed to the armature or shaft and is situated on the drive or armature shaft 6 of the DC motor 2.

Figure 3:
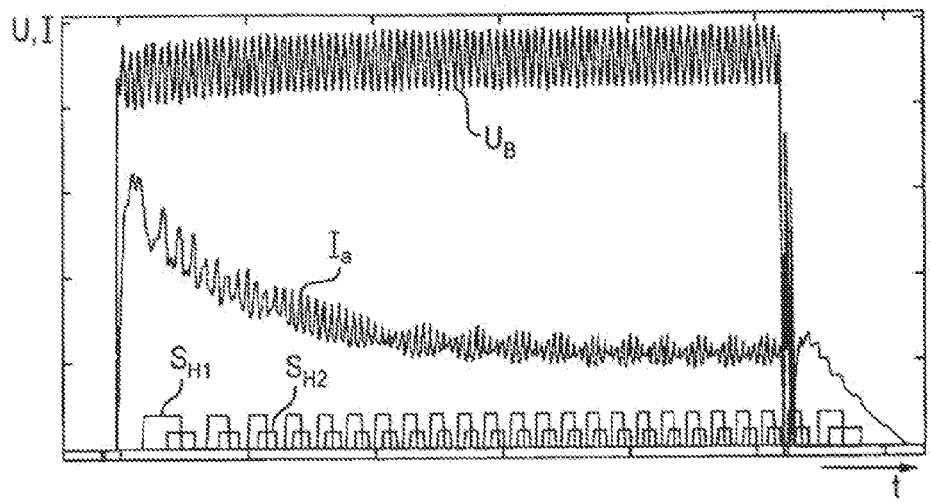
FIG. 3 is a graph showing a fluctuating motor voltage signal and an associated armature current signal over time.
Figure 4:
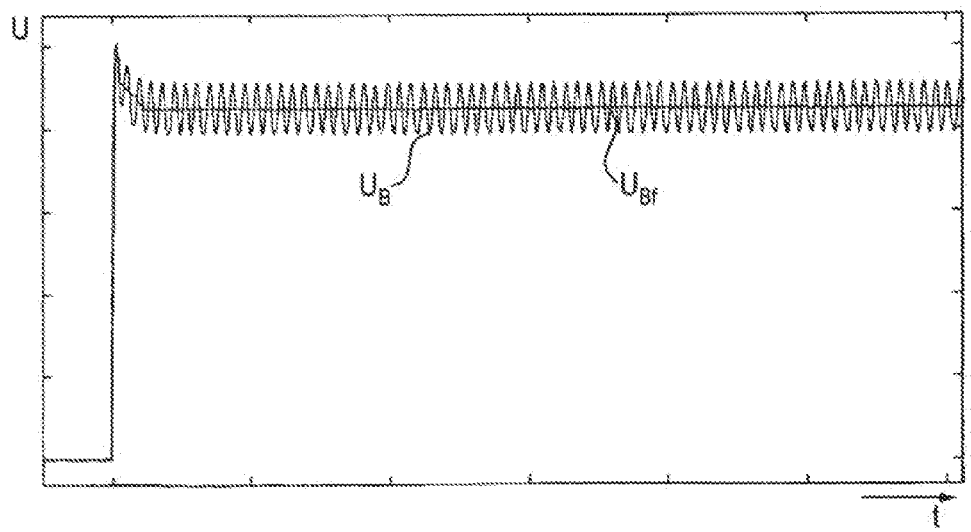
FIG. 4 is a graph according to FIG. 3, showing an unfiltered motor voltage signal and a filtered motor voltage signal.

A further aspect of the processing of the motor variables $U_B$, $U_m$ and $I_a$ is described on the basis of FIGS. 3 to 6. This aspect reflects the situation of the operating voltage (battery or on-board electrical system DC voltage) $U_B$ of the DC motor 2 being subject to operation-related fluctuations in voltage. This is illustrated in FIGS. 3 and 4 on the basis of the voltage signal (operating voltage) $U_B$ which is processed by the microprocessor 9. These fluctuations in the operating voltage $U_B$ are also reflected in the armature current $I_a$, as is illustrated in the graph according to FIG. 3. If the voltage fluctuations are in the frequency range of the current ripples $R_n$, this makes it more difficult to exactly determine and count the current ripples $R_n$ or prevents this.

The objective of the measure which is described in greater detail below is therefore to eliminate such voltage fluctuations and, to this end, to accordingly filter the operating voltage $U_B$ in order to provide the DC motor 2 with an operating voltage $U_{Bf}$ which is free of fluctuations and interference. Therefore, this aspect of the invention makes provision for the DC motor 2 to be actuated by a PWM signal $S_{PWM}$ and for the duty cycle $t_{on}/T_{PWM}$ thereof to be set as a function of the voltage fluctuations in the operating voltage $U_B$, that is to say for the so-called duty factor or duty cycle to be changed.

To this end, it should be assumed from the start that the ratio between a reference voltage $U_R$ and the on-board electrical system or battery DC voltage, which is called the operating voltage $U_B$ throughout the text which follows, is 70% and, in this case, the operating voltage $U_B$ is equal to the filtered operating voltage $U_{Bf}$. Using the duty cycle, $t_{on}=0.7 \cdot T_{PWM}$. Therefore, $t_{on}=U_R/U_{Bf} \cdot T_{PWM}$. If the current (instantaneous) operating voltage $U_B$ is not equal to the filtered operating voltage $U_{Bf}$, the duty cycle $t_{on}/T_{PWM}$ is increased or reduced, depending on the deviation. The following relationships hold true in this case:

$$t_{on1} = \frac{U_{Bf}}{U_{inst}} \cdot t_{on} = \frac{U_{Bf}}{U_{Bf}} \cdot \frac{U_R}{U_{R1}} \cdot T_{PWM} \quad (13)$$

$$t_{on1} = \frac{U_R}{U_{inst}} \cdot T_{PWM}. \quad (14)$$

In this case, $U_{Bf}$ is the filtered operating voltage, $U_R$ is the reference voltage and $U_{inst}$ is the current voltage deviation from the reference voltage $U_R$ to a relatively large or relatively small voltage value. In this case, the relationship according to equation (14) holds true for $U_R \leq U_{Bf}$.

Figure 5:
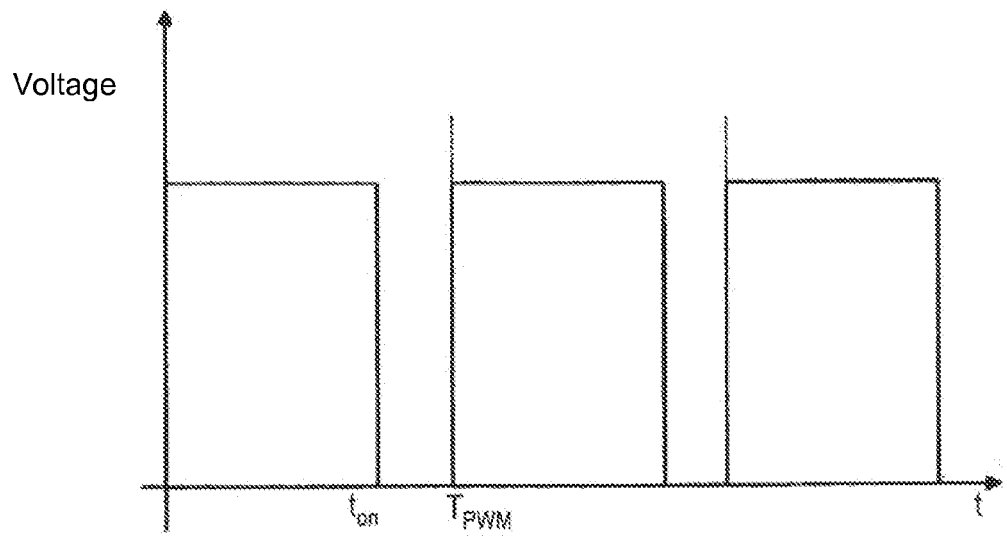
FIG. 5 is a graph showing a PWM signal with a fixed duty cycle over time.
Figure 6:
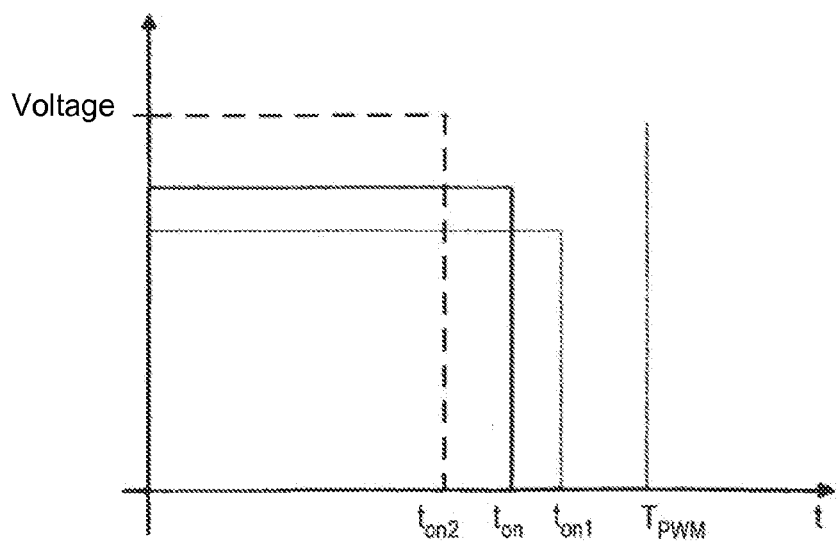
FIG. 6 is a graph according to FIG. 5 showing the PWM signal with changed duty cycles.

The duty cycle $t_{on}/T_{PWM}$ at a nominal operating voltage $U_B=U_{Bf}$, where $t_{on}=0.7 \cdot T_{PWM}$, is illustrated in FIG. 5. FIG. 6 shows a duty cycle, which is changed from this nominal duty cycle $t_{on}/T_{PWM}=70\%$, of, for example, $t_{on1}/T_{PWM}=80\%$ and $t_{on2}/T_{PWM}=60\%$. The duty cycle of 60%, which is reduced in relation to the nominal duty cycle (70%), compensates for an instantaneous voltage fluctuation to a voltage value of, for example, 13 V which is larger in comparison to the nominal operating voltage $U_B$ of, for example, 12 V. The increase in the duty cycle to 80% will analogously compensate for a voltage deviation to a smaller voltage value of, for example, 11 V.

Since the sampling frequency $f_s=1/t_s$ is set, in a suitable manner, to 20 kHz and therefore the sampling time $t_s$ or the period duration $T_{PWM}$ is set to 50 μs, the duty cycle of the PWM signal $S_{PWM}$ is adjusted virtually in real time, as a function of the voltage fluctuations, this leading to correspondingly precise filtering of the operating voltage $U_B$ and therefore to a correspondingly fluctuation-free (filtered) operating voltage $U_{Bf}$. This in turn leads to the armature current $I_a$ also being almost free of fluctuations, this ultimately leading to precise identification and counting of the current ripples $R_n$ contained in said armature current.

A further aspect of processing the motor variables $I_a$ and $U_m$ is suitable filtering of the armature current $I_a$ in order to count the current ripples $R_n$ contained in the armature current as far as possible without errors and therefore to obtain a correspondingly precise output signal which is proportional to the rotation speed. To this end, the control unit 8 contains, as a further functional module, an adjustable frequency filter 16 in the form, preferably, of a tuneable bandpass. The frequency $f_{BW}$ of the adjustable bandpass is determined by the relationship:

$$f_{BW}=n=k \cdot E \quad (15),$$

where $$E=U_m=R_a \cdot I_a \quad (16).$$

In this case, n is the rotation speed of the DC motor 2. The armature current profile $I_a$ can be determined from the rotation speed of the DC motor using equation (1) in the manner described in international patent disclosure WO 2010/028736 A2, with reference being made in this respect to the mathematical derivation according to equations (4) to (7) on pages 9 and 10 of international patent disclosure WO 2010/028736 A2.

Accordingly, a filter input signal $I_f$ which is supplied to the signal input end of the frequency filter 16 can be determined. To this end, a functional module 17 containing a multiplier 18 and containing a subtraction stage (subtractor) 19 is arranged upstream of the signal input end of the frequency filter 16. The detected armature current signal $I_a$ is supplied directly to the subtractor 19 and the motor voltage $U_m$ is supplied to the subtractor 19 via the multiplier 18 in which the measured motor voltage $U_m$ is weighted by the factor $$A = \frac{1/R_a}{(1+sL_a/R_a)}.$$

Figure 7:
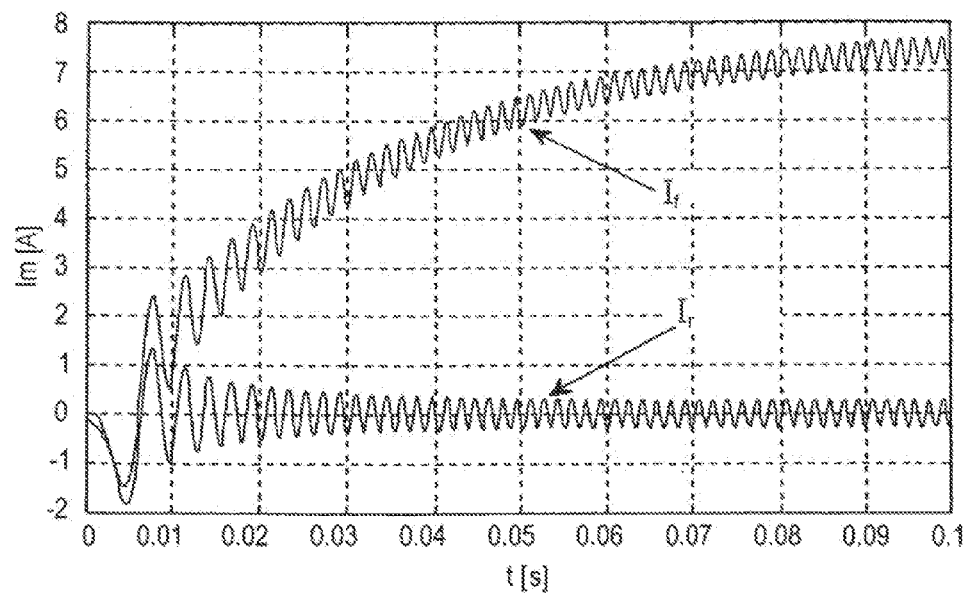
FIG. 7 is a current/time graph showing a profile of a filter input signal to and a filter output signal from the control unit.

This term corresponds to a low-pass or to a low-pass functionality of the first order and therefore forms a low-pass-characteristic factor A. The weighted signal $A \cdot U_m$ is subtracted from the detected armature current signal $I_a$ in the subtractor 19. The difference signal, of which the typical profile is shown in FIG. 7, is supplied to the frequency filter 16 as a filter input signal $I_f$.

The useful or control signal $S'_f$ (back e.m.f. signal), which is supplied to the control input end of the filter module 16 in order to determine the frequency or to set the limit or center frequency thereof, is determined by calculating the difference in a further functional module, both the armature current signal $I_a$ and the motor voltage $U_m$ likewise being supplied to the further functional module. The functional module again contains a subtraction stage (subtractor) 20. A multiplier 21, 22 is provided in each case for multiplying both the motor voltage $U_m$ by a factor p/K and also the armature current signal $I_a$ by the factors p/K and p/k·$R_a$ according to the relationships $S_f=f_{BW}=n \cdot p=k \cdot E$ and $S_f=p/k \cdot U_m - p/k \cdot R_a \cdot I_a$. In this case, p is the number of poles (number of commutator laminations and slots) of the DC motor 2. The signal $S_f$ is supplied to a low-pass filter 23 which provides the control signal $S'_f$ at its output end. The low-pass-filtered control signal $S'_f$ is supplied to the control input end of the filter module 16. The output signal (ripple signal) $I_r$ which is generated as a result of the frequency filtering, can be tapped off at the signal output end of the frequency filter 16 and is proportional to the rotation speed is likewise shown in FIG. 7.

Since the motor voltage $U_m$ is contained in the filter input signal $I_f$ and therefore in the filter operation of the filter module 16, the accuracy of the ripple count during the so-called ripple counting is increased. To this end, a digitization module 24 for digitizing the output signal $I_r$ is connected downstream of the filter module 16. The digitization module 24, from which the information relating to the (relative) position of the actuating element 3 can be tapped off, is connected, at the output end, to the ripple counter 13 or to a constituent part thereof.

Incorporating or taking into account the motor voltage $U_m$ firstly in the filter input signal $I_f$ and secondly in the control signal $S_f$ of the filter module 16 takes into account the important information relating to the switching or connection state or other motor interference influences which are reflected in the motor voltage $U_m$. The additional low-pass filtering of the useful or control signal $S_f$ prevents faulty tuning of the filter frequency of the bandpass filter 16, and therefore virtually any existing current ripple $R_n$ is also detected. The low-pass filtering smoothes the control frequency of the control signal $S_f$ and stabilizes the filter function of the bandpass filter 16.

The functional modules 16 to 24 and also 12 and 13 are realized, in particular, in the form of software modules and therefore functional constituent parts of software which is implemented in the control unit 8 or in the microcontroller 9. In this case, all or only some of the functional modules 16 to 24 and also 12 and 13 can be implemented as software in the microcontroller 9, while the remaining functional modules are then realized in the software of the control unit 8.

The invention claimed is:

1. A method for processing at least one motor variable of a mechanically commutated DC motor being supplied by an on-board electrical system DC voltage, of an actuating device for a motor vehicle, which comprises the steps of:
    detecting an armature current and a motor voltage of the mechanically commutated DC motor;
    determining an actuating position of an actuating element from a time profile of the armature current by counting current ripples contained therein;
    during an initial phase in which the mechanically commutated DC motor is supplied with current, mapping the armature current, which increases over time, by a function determined from pairs of values, which are detected in a time interval, of the motor voltage and of the armature current and extrapolating a current value of the armature current which can be expected at a later time therefrom; and
    starting a ripple count for detecting the current ripples, including a first current ripple being generated when the mechanically commutated DC motor is started up, in an event of a deviation in the armature current, which is detected at the later time, from an extrapolated armature current.

2. The method according to claim 1, which further comprises determining an armature winding resistance and an armature winding inductance from two of the pairs of values, detected in the time interval, of the motor voltage and of the armature current for determining the extrapolated armature current at the later time.

3. The method according to claim 1, which further comprises:
    during at least one of a start-up or constant-running phase which follows the initial phase, supplying the armature current to a controllable frequency filter which generates an output signal, which is proportional to a rotation speed; and
    supplying, a control signal determined from a back e.m.f. of the mechanically commutated DC motor and a filter input signal derived from the armature current and from the motor voltage, to the controllable frequency filter resulting in a low-pass filtered control signal.

4. The method according to claim 3, which further comprises determining the back e.m.f. the motor voltage and a product of the armature current and an armature resistance.

5. The method according to claim 4, which further comprises supplying the low-pass-filtered control signal to the controllable frequency filter.

6. The method according to claim 1, which further comprises actuating the mechanically commutated DC motor by means of a pulse-width-modulation signal, a duty cycle of the pulse-width-modulation signal being set in dependence on voltage fluctuations in the on-board electrical system DC voltage.

7. The method according to claim 6, which further comprises:
    setting the duty cycle of the pulse-width-modulation signal on a basis of a ratio between a reference voltage and a filter voltage, the filter voltage corresponding to the on-board electrical system voltage; and
    performing one of increasing or decreasing the duty cycle depending on a deviation in a current on-board electrical system DC voltage from the filter voltage.

8. An actuating device for a motor vehicle, comprising:
    a mechanically commutated DC motor being supplied by an on-board electrical system DC voltage; and
    a control unit for actuating said mechanically commutated DC motor, said control unit programmed to perform a method for processing at least one motor variable of said mechanically commutated DC motor, which comprises the steps of:
        detecting an armature current and a motor voltage of said mechanically commutated DC motor;
        determining an actuating position of an actuating element from a time profile of the armature current by counting current ripples contained therein;
        during an initial phase in which said mechanically commutated DC motor is supplied with current, mapping the armature current, which increases over time, by a function determined from pairs of values, which are detected in a time interval, of the motor voltage and of the armature current and extrapolating a current value of the armature current which can be expected at a later time therefrom; and
        starting a ripple count for detecting the current ripples, including a first current ripple being generated when said mechanically commutated DC motor is started up, in an event of a deviation in the armature current, which is detected at the later time, from an extrapolated armature current.

9. The actuating device according to claim 8, further comprising a bridge circuit operating as a step-down actuator and having two bridge paths each with a high-potential-side semiconductor switch and a low-potential-side semiconductor switch, said mechanically commutated DC motor connected into said bridge circuit between said two bridge paths, said high-potential-side and said low-potential-side semiconductor switches being connected, at a control input end, to said control unit.

10. The actuating device according to claim 9, wherein said control unit contains a microprocessor and a ripple counter coupled said microprocessor and is started with a first detected current ripple.

* * * * *